C. SACERDOTI.
ARRANGEMENT OF ELECTRIC STORAGE BATTERIES IN SUBMARINES.
APPLICATION FILED SEPT. 20, 1916.

1,293,209.

Patented Feb. 4, 1919.
2 SHEETS—SHEET 1.

INVENTOR:
CESARE SACERDOTI
BY:
ATTORNEY.

C. SACERDOTI.
ARRANGEMENT OF ELECTRIC STORAGE BATTERIES IN SUBMARINES.
APPLICATION FILED SEPT. 20, 1916.

1,293,209.

Patented Feb. 4, 1919.
2 SHEETS—SHEET 2.

INVENTOR:
CESARE SACERDOTI
BY:
ATTORNEY

UNITED STATES PATENT OFFICE.

CESARE SACERDOTI, OF GENOA, ITALY.

ARRANGEMENT OF ELECTRIC STORAGE BATTERIES IN SUBMARINES.

1,293,209.

Specification of Letters Patent.

Patented Feb. 4, 1919.

Application filed September 20, 1916. Serial No. 121,201.

*To all whom it may concern:*

Be it known that I, CESARE SACERDOTI, a subject of the King of Italy, residing at Genoa, Italy, (whose post-office address is Via Corsica N. 10, Genoa, Italy,) have invented a certain new and useful Improved Arrangement of Electric Storage Batteries in Submarines, of which the following is a specification.

This invention has for its object to provide a new arrangement of electric storage batteries in submarines, and it consists in placing the storage batteries in spaces that are completely separated from the living spaces of the ship and the spaces reserved for the going to and fro of the crew.

The present invention has also for its object to satisfy a number of requirements, namely:

(*a*) To provide easy access to each battery cell so as to be able to inspect it during the charging without having to remove any parts.

(*b*) To separate the spaces for the battery from and render them independent of the other spaces in the ship, thereby preventing gases or vapors that may be given off by the batteries from entering the said other spaces.

The manner in which this invention is to be performed will now be more particularly described with reference to the accompanying drawings which illustrate two modifications of the invention.

Figure 1:
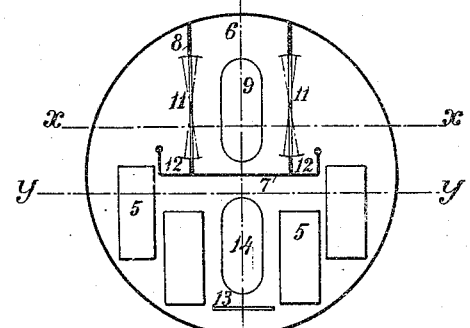
Figure 1 is a vertical cross section of a submarine, that is to say of the inner shell according to the first modification; neither the outer shell nor the superstructure, etc., which has no relation to the improved arrangement, is shown.
Figure 2:
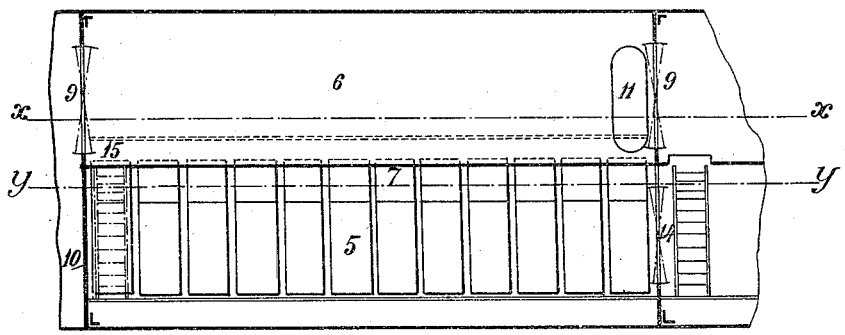
Fig. 2 is a longitudinal section of the space adapted for the purposes of this invention.
Figure 3:
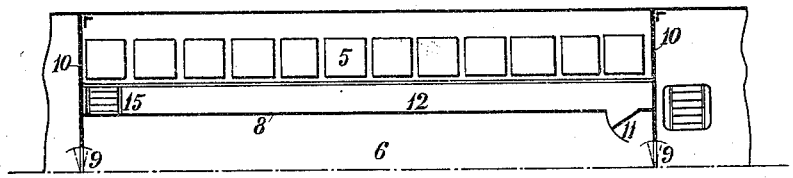
Fig. 3 is a horizontal section on the line x—x of Figs. 1 and 2.
Figure 4:
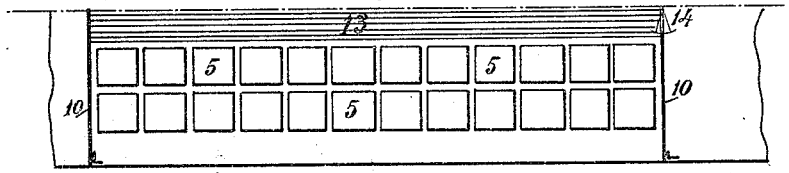
Fig. 4 is a horizontal section on the line y—y of Figs. 1 and 2.

5 are the storage batteries which are arranged in longitudinal series or rows below and along the sides of a caisson 6 formed in the interior of the space and bounded by a bottom 7 and longitudinal partitions 8. This caisson may serve as a living room or for other purposes, and the normal traffic lengthwise of the ship can take place through it by means of doors or openings 9 formed in the bulkheads 10. From the space 6 access can be had through the doors or openings 11 formed in the longitudinal partitions 8, into two side gangways 12, 12, from which it is possible to inspect the outer rows of the storage batteries.

Access is had to the central rows of batteries by means of the central gangways 13 which are reached either through the door 14 formed in one of the bulkheads, or through a hatchway 15 formed in the bottom 7 of the upper caisson 6.

The caisson is constructed so as to be capable of being partly dismembered for the purpose of permitting the storage batteries to be removed therefrom easily whenever it is necessary.

The improved construction or arrangement is the same even when the cross section of the space is not cylindrical and the storage batteries are situated in a number of chambers instead of in one single chamber.

Figure 5:
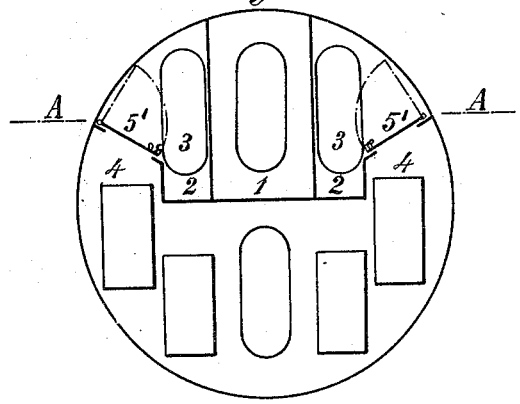
Fig. 5 is a vertical cross section of a submarine showing the second modification of the invention, only the inner shell being shown.
Figure 6:
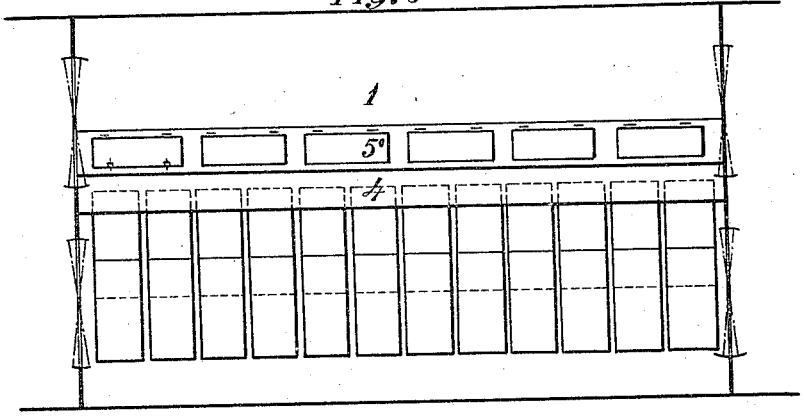
Fig. 6 is a longitudinal section of the spaces for the batteries; a longitudinal partition having been removed.
Figure 7:
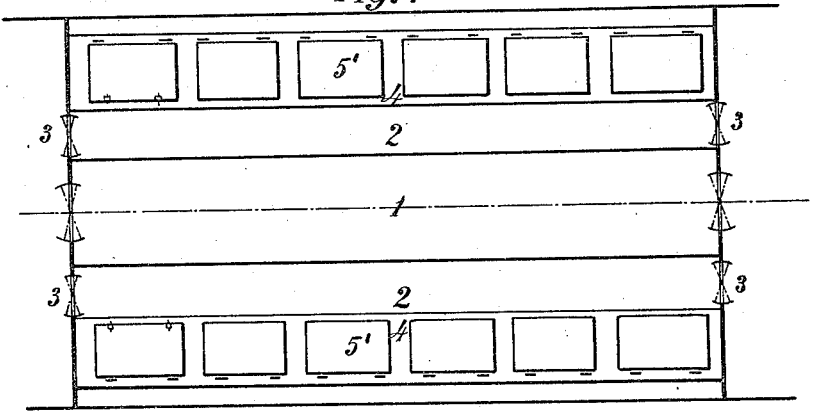
Fig. 7 is a horizontal section of the spaces on the line A—A of Fig. 5.

In the second modification of this invention (Fig. 5) storage batteries, 4, are insulated from the central caisson, 1, and the two side gangways, 2, accessible by means of opening, 3, are fitted with doors 5 which allow of the inspection and upkeep of the storage batteries in the side rows, the said doors being adapted to be closed airtight by any suitable means for the purpose of preventing the gases given off by the batteries from entering the service gangways.

What I claim is:—

1. In combination with the battery compartment of a vessel, a caisson in the top of the compartment, doors in the sides of the caisson, and gangways connected to the caisson near each door and spaced from the sides of the compartment.

2. In combination with the battery compartment of a vessel, a caisson in the top of the compartment, a door in a side of the caisson, and a gangway connected to the caisson near the door and spaced from the side of the compartment.

3. In combination with the battery compartment of a vessel, a caisson in the top of the compartment, doors in the sides of the caisson, gangways connected to the caisson near each door and spaced from the sides of the compartment, and a door in the end wall of the compartment below the caisson.

4. In combination with the battery compartment of a vessel, a caisson in the top of the compartment, doors in the sides of the caisson, gangways connected to the caisson near each door and spaced from the sides of the compartment, and doors in the end walls of the compartment leading to the caisson.

5. In a submarine, two cross partitions defining a storage-battery compartment, a horizontal partition therein and longitudinal side partitions forming an airtight caisson, and two side gangways connecting with the caisson.

6. In a submarine, a storage battery compartment having an inspection gangway an airtight caisson thereon having longitudinal partitions, two side gangways connecting with the caisson, said caisson having openings for giving access therefrom to any of the gangways.

7. In a submarine, a storage battery compartment having an inspection gangway, an airtight caisson having longitudinal partitions, two side gangways connecting with the caisson, said caisson having openings for giving access therefrom to any of the gangways, and gastight doors fitting said openings.

In testimony whereof I have signed my name to this specification in presence of two subscribing witnesses.

CESARE SACERDOTI.

Witnesses:
 LUIGI BENVENUTI,
 C. CLETUS MILLER.

Copies of this patent may be obtained for five cents each, by addressing the "Commissioner of Patents, Washington, D. C."